(12) United States Patent
Kwon et al.

(10) Patent No.: US 9,293,795 B2
(45) Date of Patent: Mar. 22, 2016

(54) APPARATUS AND METHOD FOR CONTROLLING COOLING OF BATTERY OF ENVIRONMENT-FRIENDLY VEHICLE

(71) Applicant: Hyundai Motor Company, Seoul (KR)

(72) Inventors: Mun Soon Kwon, Gyeonggi-do (KR); Won Seon Sim, Gyeonggi-do (KR); Dae Sung Kim, Gyeonggi-do (KR); Hyun Cheol Bae, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 189 days.

(21) Appl. No.: 14/061,144

(22) Filed: Oct. 23, 2013

(65) Prior Publication Data

US 2014/0370333 A1 Dec. 18, 2014

(30) Foreign Application Priority Data

Jun. 18, 2013 (KR) .......................... 10-2013-0069444

(51) Int. Cl.
*B60K 13/02* (2006.01)
*H01M 10/613* (2014.01)
*B60L 11/18* (2006.01)
*H01M 10/625* (2014.01)
*H01M 10/63* (2014.01)
*H01M 10/6563* (2014.01)

(52) U.S. Cl.
CPC ........... *H01M 10/5004* (2013.01); *B60L 11/18* (2013.01); *H01M 10/613* (2015.04); *H01M 10/625* (2015.04); *H01M 10/63* (2015.04); *H01M 10/6563* (2015.04)

(58) Field of Classification Search
CPC ......... B60K 11/00; B60K 11/04; B60K 13/02

USPC ...................................... 180/68.1, 68.2, 68.3
See application file for complete search history.

(56) References Cited

U.S. PATENT DOCUMENTS

| 6,624,615 | B1 * | 9/2003 | Park ............................. 320/150 |
| 2005/0077874 | A1 * | 4/2005 | Nakao .......................... 320/116 |
| 2007/0139017 | A1 * | 6/2007 | Marchand et al. ............ 320/150 |
| 2011/0071336 | A1 * | 3/2011 | Yomtov et al. ................. 600/16 |
| 2012/0013201 | A1 | 1/2012 | Pariseau et al. |
| 2013/0116876 | A1 * | 5/2013 | Park .............................. 701/22 |
| 2014/0121869 | A1 * | 5/2014 | Lee et al. ....................... 701/22 |

FOREIGN PATENT DOCUMENTS

| JP | 2000-156903 A | 6/2000 |
| KR | 10-2003-0067862 | 8/2003 |
| KR | 10-2007-0050680 | 5/2007 |
| KR | 10-2008-0092688 A | 10/2008 |
| KR | 10-2012-0045926 | 5/2012 |
| KR | 10-2012-0136821 A | 12/2012 |

\* cited by examiner

*Primary Examiner* — Hau Phan
(74) *Attorney, Agent, or Firm* — Mintz Levin Cohn Ferris Glovsky and Popeo, P.C.; Peter F. Corless

(57) ABSTRACT

An apparatus and a method for controlling cooling of a battery of an environment-friendly vehicle which transmits only a control condition from a BMS to a motor controller for cooling is provided. In particular, a cooling fan motor controller and the battery management system (BMS) are connected through a controller area network (CAN) communication, and a backup controller to which a backup power is supplied operates the cooling fan motor controller, when CAN communication is abnormal, to instruct a control condition for a cooling fan motor controller. As such, a stable control for a cooling fan motor for cooling the battery is provided.

10 Claims, 6 Drawing Sheets

APPARATUS AND METHOD FOR CONTROLLING COOLING OF BATTERY OF ENVIRONMENT-FRIENDLY VEHICLE

CROSS-REFERENCE TO RELATED APPLICATION

This application claims under 35 U.S.C. §119(a) the benefit of Korean Patent Application No. 10-2013-0069444, filed on Jun. 18, 2013, the entire contents of which are incorporated herein by reference.

BACKGROUND (a) Technical Field

The present invention relates to an apparatus and a method for controlling cooling of a battery of an environment-friendly vehicle, and more particularly, to an apparatus and a method for controlling cooling of a battery of an environment-friendly vehicle which can perform backup control for operating a cooling fan motor when a Controller Area Network (CAN) communication is abnormal, by disposing a motor controller configured to control cooling of the battery and a control element of a Battery Management System (BMS).

(b) Background Art

A motor mounted within environment-friendly vehicles such as a hybrid electric vehicle, an electric vehicle, and a fuel cell vehicle is often provided as at least one driving power source in these types of vehicles. As such, a high voltage battery is typically mounted within the vehicles as well as a source of power for the motor. In order to efficiently operate the high voltage battery and the motor, a battery cooling system and motor cooling system (using a coolant such as water) is also provided to prevent the battery and the motor from overheating.

In particular, the battery cooling system is important to the overall operation of the vehicular drivetrain in that it maintains the battery at an optimum performance by cooling the battery to a predetermined temperature, since the battery is one of the most basic and important components in environment-friendly vehicles.

For example, one configuration and operation of a battery cooling control system is according to the related art will be described below with reference to FIGS. 1 and 2. The battery cooling control system according to the related art includes a cooling fan motor controller 20 that controls a cooling fan for cooling a battery and a motor to drive the cooling fan, and a battery management system 10 (hereinafter, referred to as BMS). The BMS is a high level controller which may be configured to controller a number of other controllers or components in the battery cooling system.

Additionally, the cooling fan motor controller 20 in FIGS. 1 and 2 has integrated therein a cooling fan relay 22 that is connected to an auxiliary battery power source, a rotation speed detection sensor 24 that detects a rotation speed (RPM) of a cooling fan motor 25, and a motor driving controller 26 that operates the cooling fan motor 25. More specifically, the rotation speed detection sensor 24 is often mounted to the cooling fan motor controller 20 as a separate PCB type sensor.

Likewise a cooling fan controller 14 is also integrated into the BMS which includes a power circuit 11 and a CAN communication adaptor 12 for a CAN communication. In particular, the cooling fan controller 14 of the BMS 10 includes a relay controller 16 connected to the relay 22 of the cooling fan motor controller 20 through wires 28, and a speed controller 18 connected to the motor driving controller 26 and the rotation speed detection sensor 24 of the cooling fan motor controller 20 through wires 28 to control a rotation speed of the motor.

During operation, the relay controller 16 of the cooling fan controller 14 controls an on/off operation of the relay 22 of the cooling fan motor controller 20, and the speed controller 18 of the cooling fan controller 14 receives a signal from the rotation speed detection sensor 24 of the cooling fan motor controller 20 which specifies or indicates to the cooling fan controller the proper motor speed control signal that should be provided to the motor driving controller 26.

However, the battery cooling control system according to the related art has the following problems.

As shown in FIG. 2, when wire connecting the relay 22 of the cooling fan motor controller 20 and the relay controller 16 of the BMS 10, and wires connecting the motor driving controller 26 of the cooling fan motor controller 20 and the speed controller 18 of the BMS 10 are broken, it is impossible to control an on/off operation of the relay 22 and to transmit a speed control signal (pulse width modulating (PWM) signal) from the speed controller 18 to the motor driving controller 26. As the on/off control of the relay 22 and the motor speed control cannot be performed, it may be impossible to drive the cooling fan motor and accordingly the battery may become overheated.

Further, when the relay of the cooling fan motor controller is switched on or off in a normal state, noise is generated.

Furthermore, an expensive PCB type rotation speed detection sensor for detecting a motor speed is currently separately mounted on an interior surface of the cooling fan motor controller, thus increasing the manufacturing cost.

SUMMARY OF THE DISCLOSURE

The present invention provides an apparatus and a method for controlling cooling of a battery of an environment-friendly vehicle which transmits only a control condition from a BMS to a motor controller for cooling, by connecting a cooling fan motor controller and the BMS through a CAN communication, and operates a backup controller to which a backup power is supplied, when CAN communication is abnormal, to provide a control condition for a cooling fan motor controller. As such, the apparatus and method are able to stably control the cooling of the battery while being able to integrate the motor driving controller, speed controller and a backup controller into the cooling fan motor controller, thus eliminating the need for a relay and the rotation speed detection sensor of the related art.

In accordance with an aspect of an exemplary embodiment of the present invention, there is provided an apparatus for controlling cooling of a battery of an environment-friendly vehicle, the apparatus including: a BMS configured to transmit a cooling fan motor control condition to a cooling fan motor controller through a CAN communication line; and a cooling fan motor controller configured to control a speed and operation of a cooling fan motor while transmitting and receiving a cooling fan motor control condition from the BMS. More specifically, the cooling fan motor controller may include: a CAN communication adaptor that transmits and receives a cooling fan control condition from the BMS, a speed controller that controls a rotation speed of the cooling fan motor according to the cooling fan control condition, a motor driving controller that operates the cooling fan motor according to a speed signal of the speed controller, and a backup controller receives backup power when a CAN communication is abnormal, and temporarily controls the speed controller and the motor driving controller through a backup signal.

More specifically, in some exemplary embodiments of the present invention, a first ignition may be adopted as backup power for outputting a backup signal of the backup controller. Additionally, an alarm configured to indicate when the cooling fan motor is abnormal may be connected to the cooling fan motor controller via the CAN communication line.

In accordance with another aspect of the present invention, there is provided a method of controlling cooling of a battery of an environment-friendly vehicle, the method may include: transmitting, via the CAN communication adaptor (network adaptor) a cooling fan motor control condition from a BMS to the cooling fan motor controller through a CAN communication; controlling, by the speed controller, a rotation speed of a cooling fan motor in the speed controller of the cooling fan motor controller according to the cooling fan motor control condition; operating, by the motor driving controller, the cooling fan motor in the motor driving controller of the cooling fan motor controller according to the cooling fan motor control condition; and when the CAN communication line is abnormal, transmitting the cooling fan motor control condition to the speed controller and the motor driving controller as a backup signal from the backup controller, and performing a temporary backup control of the speed controller and the motor driving controller for the cooling fan motor. As such, in some exemplary embodiments of the present invention, the backup controller may use a first ignition as backup power when the CAN communication line is abnormal.

The method may further include starting a limp home driving mode after a temporary backup control of the speed controller and the motor driving controller is performed for a predetermined time period by a backup signal of the backup controller.

The cooling fan motor controller additionally may receive a signal from a battery temperature sensor or a cooling water temperature sensor as a backup signal, and when a battery temperature or a cooling water temperature is a predetermined temperature or higher, a driving mode of the vehicle may be converted into a limp home driving mode.

Furthermore, when the cooling fan motor is abnormal, the method may further include transmitting information notifying the driver of an abnormality from the CAN communication adaptor of the cooling fan motor controller, and operating an alarm lamp and an alarm sound on a cluster at the same time.

Advantageously, according to the present invention, a backup controller which can provide a backup signal to the speed controller and the motor driving controller when the CAN communication with the BMS is abnormal, including the speed controller and the motor driving controller for controlling a speed and operation of the cooling fan motor, are integrated in the cooling fan motor controller so that the cooling fan motor can be reliably operated even when the a CAN communication is abnormal.

Further, the apparatus according to the present invention is able diagnose and provide the driver with an indication of an abnormality of the cooling fan motor via the alarm.

Furthermore, manufacturing costs can be reduced as components such as wires connecting the cooling fan motor controller and the BMS and the relay mounted in the cooling fan motor controller, including an existing expensive PCB type motor speed detection sensor, are eliminated from the system.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Figure 1:
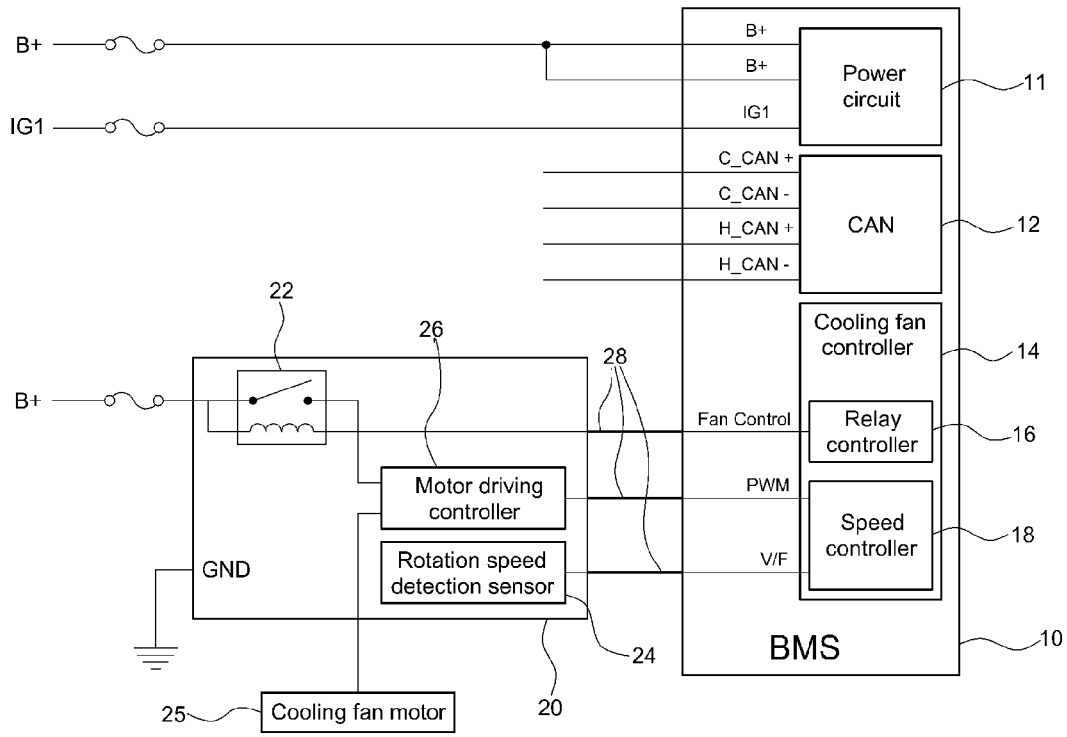
FIGS. 1 and 2 are diagrams showing a configuration of a system for controlling cooling of a battery according to the related art.
Figure 2:
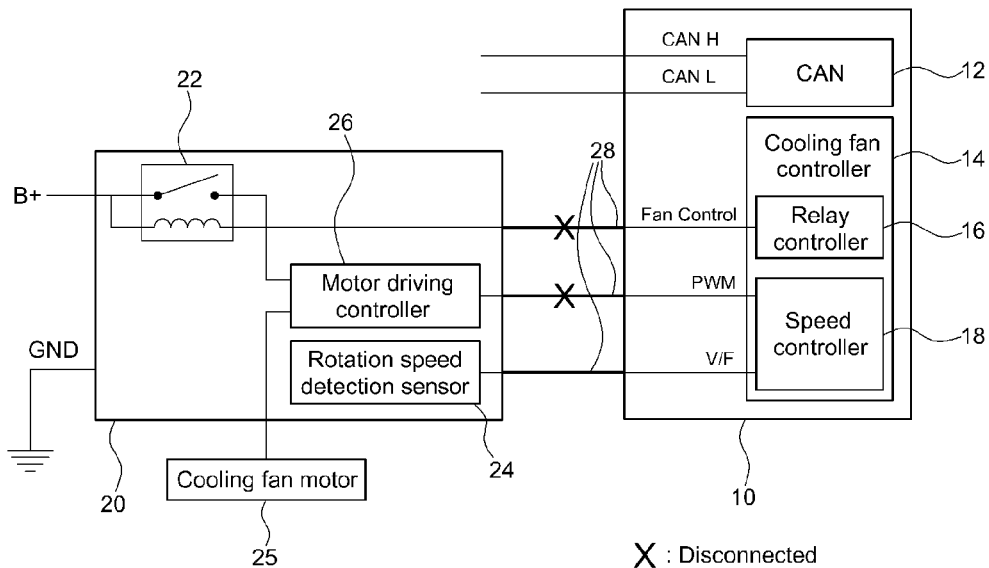

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller or adaptor. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media recorded on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, embodiments of the present invention will be described in detail with reference to the accompanying.

Figure 3:
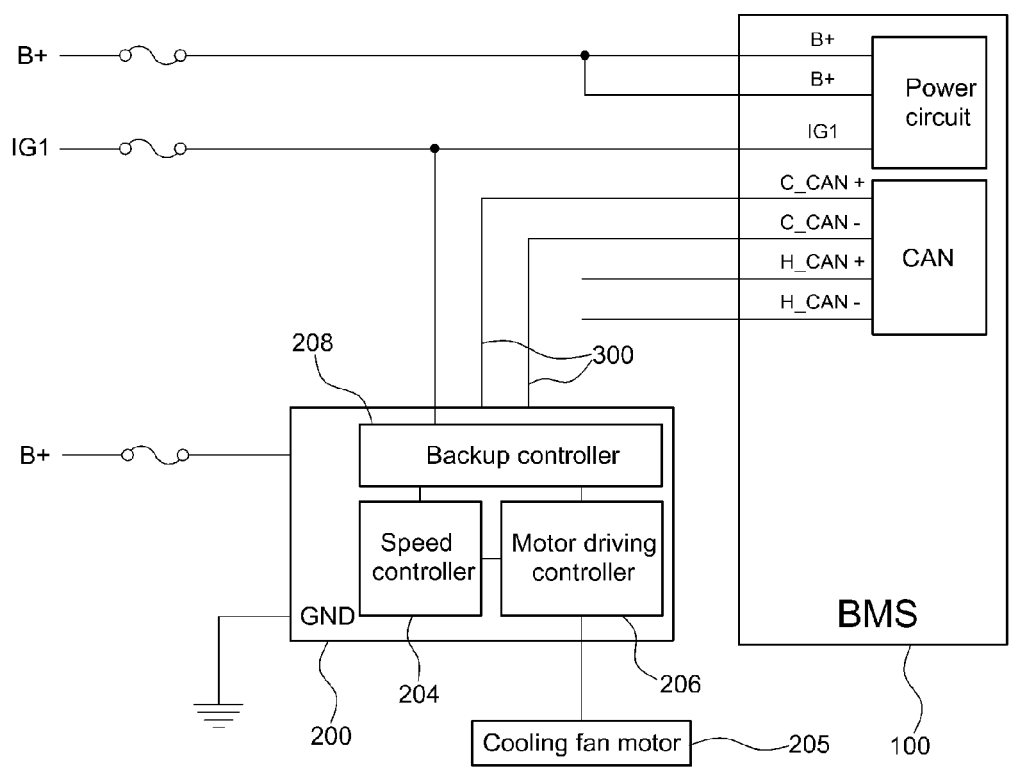
FIGS. 3 to 5 are diagrams showing configurations of cooling control apparatuses for an environment-friendly vehicle according to the exemplary embodiment of the present invention.
Figure 4:
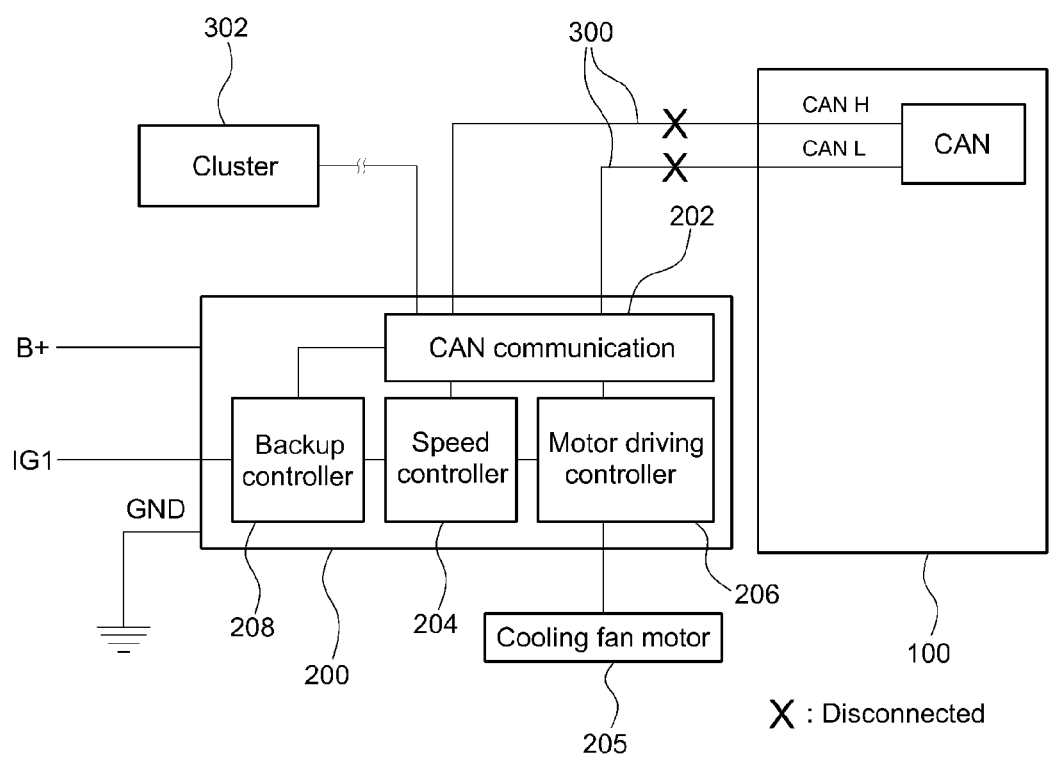
Figure 5:
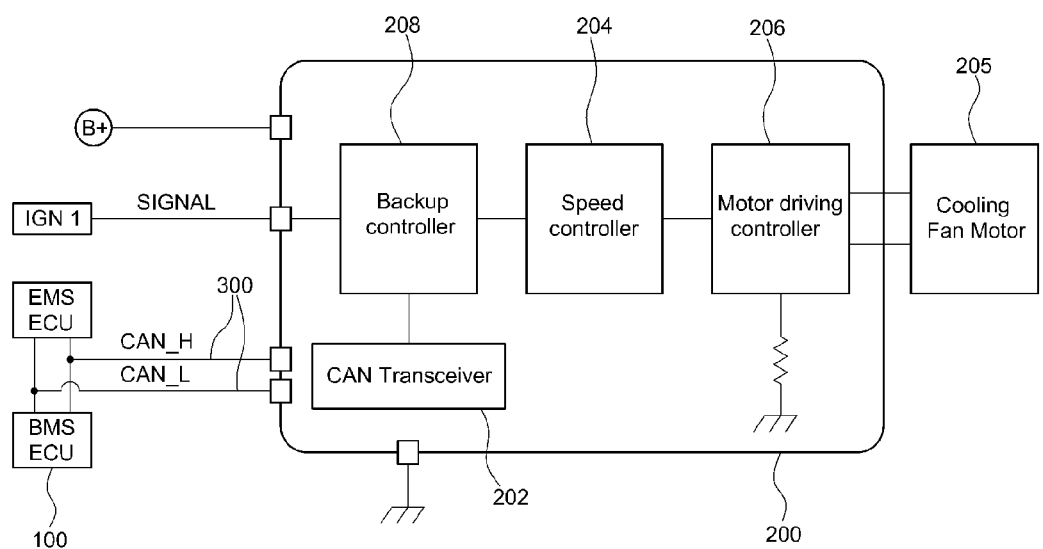

Referring to FIGS. 3 to 4 showing apparatuses for controlling cooling of a battery for an environment-friendly vehicle according to the exemplary embodiment of the present invention, unlike the related art where the BMS and a cooling fan motor controller are connected to each other through wires 28, the BMS and the cooling fan motor controller in the illustrative embodiment of the present invention are connected to each other via a CAN communication connection to communicate with each other.

As such, the BMS 100 is not directly responsible for controlling the cooling fan motor as an existing relay controller and an existing speed controller are excluded from the system, but instead transmits a cooling fan motor control condition to a cooling fan motor controller 200 through CAN communication lines 300, and receives a process for controlling the cooling fan motor from the cooling fan motor controller 200 only to monitor the cooling fan motor controller accordingly.

The cooling fan motor controller 200 receives data and conditions (for example, a battery temperature, a motor temperature, a vehicle speed, a motor rotation speed range of each battery temperature) for controlling the cooling fan motor from the BMS 100, and is directly responsible for an overall control for the cooling fan motor such as a control of the speed and operation of the cooling fan motor, and a backup control in which the control for the cooling fan motor can be continued for a predetermined time period when a CAN communication is abnormal or has failed.

To this end, a CAN communication adaptor 202 that is configured to transmit and receive a cooling fan motor control condition from the BMS 100, a speed controller 204 that controls a rotation speed of the cooling fan motor according to the cooling fan motor control condition, and a motor driving controller 206 that operates a cooling fan motor 205 according to a speed signal of the speed controller 204 are integrated within the cooling fan motor controller 200 of the exemplary embodiment of the present invention.

In addition, a backup controller 208 is also integrated into the cooling fan motor controller 200. The backup controller 208 is configured to receive backup power when the CAN communication lines 300 are abnormal to temporarily control the speed controller 204 and the motor driving controller 206 with a backup signal.

Preferably, when the CAN communication lines of the BMS 100 are abnormal, a first ignition IG1 including a state in which a vehicle is being started and a state in which the vehicle has been started, is used as the backup power for outputting a backup signal of the backup controller 208. Accordingly, the first ignition is connected to the backup controller 208 as the backup power.

Then, when an operation of the cooling fan motor 205 is abnormal due to, e.g., locking of a motor, a breakdown of an FET element, a breakdown of a motor axis detection sensor, or the like, an alarm (for example, an indicator on a cluster) indicates to driver that an abnormality of the cooling fan motor has occurred. The alarm is connected to the cooling fan motor controller 200 indicate the abnormality to the driver via the CAN communication lines.

Hereinafter, a method of controlling cooling of the battery based on the above configuration will be described.

First, cooling fan motor control conditions (e.g., a battery temperature, a motor temperature, a vehicle speed, a motor rotation speed range of each battery temperature, etc.) are transmitted from the BMS 100 to the cooling fan motor controller 200 through the CAN communication lines.

Thus, the speed controller 204 (for example, a system integrated circuit (IC) for driving a motor) of the cooling fan motor controller 200 controls a rotation speed of the cooling fan motor 205 at a constant speed according to the cooling fan motor control conditions, and the motor driving controller 206 (for example, a metal-oxide-semiconductor field-effect transistor (MOSFET)) of the cooling fan motor controller 200 operates the cooling fan motor at a constant speed.

Then, the rotation speed (RPM) of the cooling fan motor 205 may be measured through a general sensorless algorithm, and may be utilized as a control factor for the speed controller 204. In this way, the cooling fan motor controller 200 is directly responsible for the speed and operation of the cooling fan motor so that the battery can be continuously cooled by rotating a cooling fan according to operation of the cooling fan motor 205, components such as an existing PCB type motor speed detection sensor and the relay can be eliminated so that manufacturing costs can be decreased, and noise generated according to the on/off operation of the relay can be eliminated.

Figure 6:
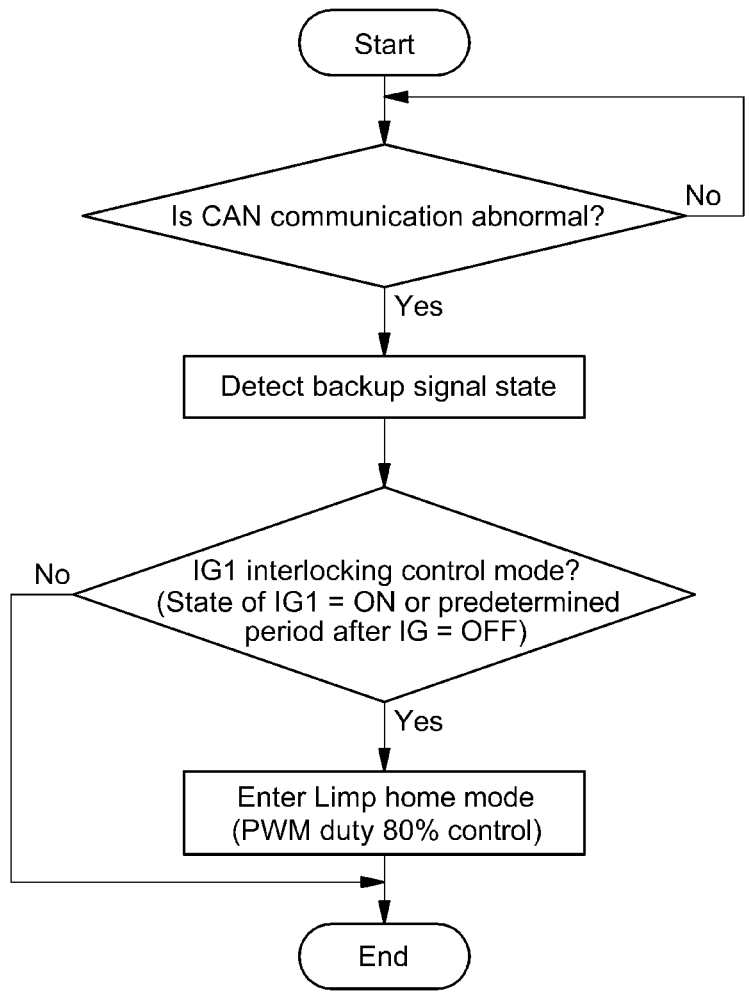
FIGS. 6 and 7 are flowcharts showing methods of controlling cooling of a battery for an environment-friendly vehicle according to the exemplary embodiment of the present invention.

Meanwhile, when the CAN communication between the BMS 100 and the cooling fan motor controller 200 is abnormal, the cooling fan motor control condition may not be transmitted and received between the BMS 100 and the cooling fan motor controller 200. In order to solve this problem, a series of backup control processes, in which the backup controller 208 receives the backup power and temporarily controls the speed controller 204 and the motor driving controller 206 with the backup power, is performed as in the flowchart of FIG. 6.

That is, when the CAN communication lines are abnormal, the cooling fan motor control conditions are transmitted to the speed controller 204 and the motor driving controller 206 as the backup signals of the backup controller 208 so that a temporary backup control of the speed controller 204 and the motor driving controller 206 for the cooling fan motor 205 is performed. Then, after the temporary backup control of the speed controller 204 and the motor driving controller 206 is performed for a predetermined time period by the backup signal of the backup controller 208, a driving mode of a vehicle is converted into a limp home driving mode through which the vehicle can be driven to a service center in the case of an emergency.

When the driving mode of the vehicle is converted into the limp home driving mode, the motor driving controller 206 may PWM control the cooling fan motor at a constant duty so that a battery cooling operation performed by the cooling fan according to driving of the cooling fan motor is continuously performed until the vehicle arrives at the service center.

As another exemplary embodiment of the present invention, the backup controller 208 of the cooling fan motor controller 200 additionally may receive a signal from a battery temperature sensor or a cooling water temperature sensor as a backup signal, and when a temperature of a battery or cooling water is a predetermined temperature or higher, the battery or the motor may be considered to be overheated so that a control step by which the driving mode of the vehicle is converted into the limp home driving mode is further performed.

Meanwhile, after the cooling fan motor control signal from the cooling fan motor controller 200 is ordinarily output while the cooling fan motor control conditions are normally transmitted and received between the BMS 100 and the cooling fan motor controller 200 so that the cooling fan motor is normally driven, the cooling fan motor may become abnormal due to, e.g., locking of the motor, a breakdown of an FET element, a breakdown of a motor shaft location detection sensor, or the like.

Figure 7:
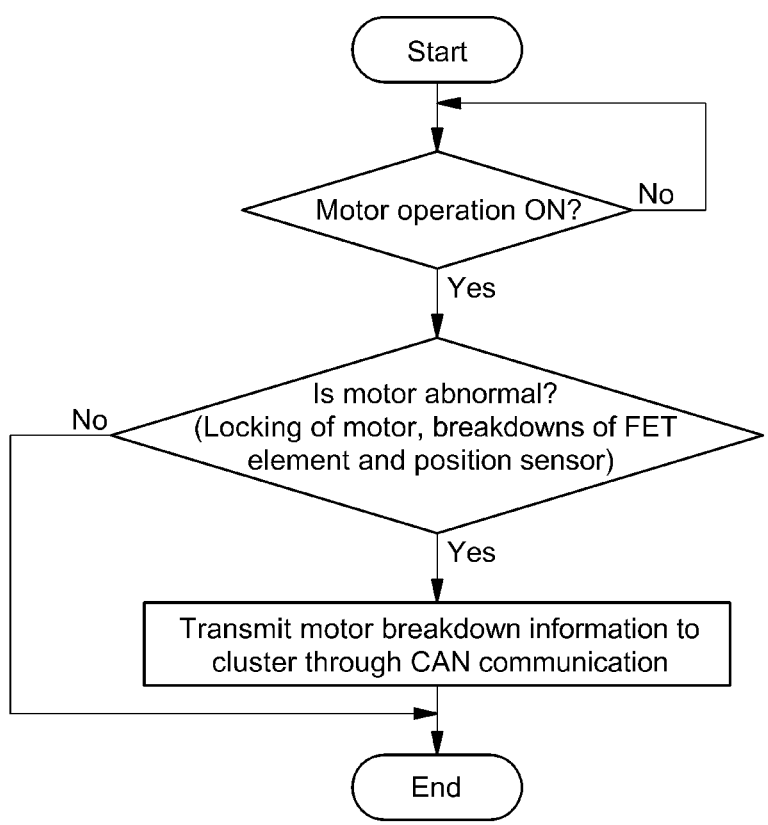

As shown in a flowchart of FIG. 7, when the cooling fan motor control by the cooling fan motor controller 200 is not performed due to an abnormal operation of the cooling fan motor 205, the cooling fan motor controller 200 can become aware of an abnormal state of the cooling fan motor and the CAN communication adaptor 202 transmits a signal notifying that the cooling fan motor that the CAN communication is abnormal to a cluster 302 installed at a front side of a driver's seat at the same time, and an alarm lamp configured in the cluster may be turned on. At the same time, an alarm sound is emitted to alarm a driver of the breakdown of the cooling fan motor.

What is claimed is:

1. An apparatus for controlling cooling of a battery of an environment-friendly vehicle, the apparatus comprising:
    a battery management system (BMS) for transmitting a cooling fan motor control condition to a cooling fan motor controller through a controller area network (CAN) communication line; and
    the cooling fan motor controller configured to control a speed and operation of a cooling fan motor while transmitting and receiving cooling fan motor control condition from the BMS,
    wherein the cooling fan motor controller comprises:
        a CAN communication adaptor configured to transmit and receive the cooling fan control condition from the BMS;
        a speed controller configured to control a rotation speed of the cooling fan motor according to the cooling fan control condition;
        a motor driving controller configured to operate the cooling fan motor according to a speed signal from the speed controller; and
        a backup controller configured to receive backup power when a CAN communication is abnormal, and temporarily control the speed controller and the motor driving controller through a backup signal,
    wherein the cooling fan motor controller is configured to receive a signal from a battery temperature sensor or a cooling water temperature sensor as the backup signal for a limp home driving mode.

2. The apparatus of claim 1, wherein a first ignition is adopted as a backup power for outputting the backup signal of the backup controller.

3. The apparatus of claim 1, wherein an alarm configured to indicate that the cooling fan motor is abnormal and is connected to the cooling fan motor controller via the CAN communication line.

4. A method of controlling cooling of a battery of an environment-friendly vehicle, the method comprising:
    transmitting, a controller area network (CAN) communication, a cooling fan motor control condition from a battery management system (BMS) to a cooling fan motor controller;
    controlling, by a speed controller of the cooling fan motor controller, a rotation speed of a cooling fan motor according to the cooling fan motor control condition;
    operating, by a motor driving controller of the cooling fan motor controller, according to the cooling fan motor control condition; and
    when the CAN communication line is abnormal, transmitting the cooling fan motor control condition to the speed controller and the motor driving controller as a backup signal from the backup controller, and performing a temporary backup control of the speed controller and the motor driving controller for the cooling fan motor,
    wherein the cooling fan motor controller additionally receives a signal from a battery temperature sensor or a cooling water temperature sensor as the backup signal, and when a battery temperature or a cooling water temperature is a predetermined temperature or higher, a driving mode of the vehicle is converted into a limp home driving mode.

5. The method of claim 4, wherein the backup controller uses a first ignition as backup power when the CAN communication line is abnormal.

6. The method of claim 4, further comprising starting a limp home driving mode after a temporary backup control of the speed controller and the motor driving controller is performed for a predetermined time period by a backup signal from the backup controller.

7. The method of claim 4, further comprising, when the cooling fan motor is abnormal, transmitting information notifying a driver of an abnormality from the CAN communication adaptor of the cooling fan motor controller, and operating an alarm lamp and an alarm sound within a cluster at the same time.

8. A vehicle operable in at least an HEV (Hybrid Electric Vehicle) mode and an EV (Electric Vehicle) mode, comprising:
    a cooling fan motor controller configured to control a speed and operation of a cooling fan motor while transmitting and receiving a cooling fan motor control condition from a battery management system (BMS),
    wherein the cooling fan motor controller includes:
        a controller area network (CAN) communication adaptor configured to transmit and receive the cooling fan control condition from the BMS;
        a speed controller configured to control a rotation speed of the cooling fan motor according to the cooling fan control condition;
        a motor driving controller configured to operate the cooling fan motor according to a speed signal from the speed controller; and
        a backup controller configured to receive backup power when a CAN communication is abnormal, and temporarily control the speed controller and the motor driving controller through a backup signal,
    wherein the cooling fan motor controller is configured to receive a signal from a battery temperature sensor or a cooling water temperature sensor as the backup signal for a limp home driving mode.

9. The vehicle of claim 8, wherein a first ignition is adopted as a backup power for outputting the backup signal of the backup controller.

10. The vehicle of claim 8, wherein an alarm configured to indicate that the cooling fan motor is abnormal and is connected to the cooling fan motor controller via the CAN communication line.

* * * * *